United States Patent [19]

Lawhon et al.

[11] Patent Number: 4,645,677
[45] Date of Patent: Feb. 24, 1987

[54] PROCESS FOR REMOVING FLATULENCE-CAUSING SUGARS FROM BEAN PRODUCTS

[75] Inventors: James T. Lawhon, College Station; Edmund W. Lusas, Bryan, both of Tex.

[73] Assignee: The Texas A&M University System, College Station, Tex.

[21] Appl. No.: 677,811

[22] Filed: Dec. 4, 1984

[51] Int. Cl.$^4$ .............................................. A23L 1/20
[52] U.S. Cl. ................................... 426/431; 426/478; 426/495; 426/507; 426/634
[58] Field of Search ............... 426/629, 632, 634, 431, 426/495, 430, 507, 598, 481, 425, 489, 656; 210/650, 651

[56] References Cited

U.S. PATENT DOCUMENTS

| | | | |
|---|---|---|---|
| 3,995,071 | 11/1976 | Goodnight, Jr. | 426/598 |
| 4,060,203 | 11/1977 | Edwards | 241/7 |
| 4,088,795 | 5/1978 | Goodnight, Jr. et al. | 426/598 |
| 4,091,120 | 5/1978 | Goodnight, Jr. et al. | 426/598 |
| 4,156,028 | 5/1979 | Hidalgo | 426/276 |
| 4,163,714 | 8/1979 | Gregor | 210/23 |
| 4,194,018 | 3/1980 | Hodel | 426/580 |
| 4,215,040 | 7/1980 | Hager | 260/123.5 |
| 4,235,937 | 11/1980 | Remer | 426/534 |
| 4,285,862 | 8/1981 | Murray | 260/123.5 |
| 4,324,811 | 4/1982 | Eugley | 426/656 |
| 4,325,977 | 4/1982 | Remer | 426/534 |
| 4,325,978 | 4/1982 | Remer | 426/534 |
| 4,381,316 | 4/1983 | Brotsky | 426/265 |
| 4,420,425 | 12/1983 | Lawhon | 260/123.5 |

OTHER PUBLICATIONS

Becker, Robert et al., "Conditions for the Autolysis of Alpha-Galactosides and Phytic Acid in California Small White Beans", Journal of Food Science, vol. 39 (1974), pp. 766-769.

Satterlee, L. D. et al., "Functional Properties of the Great Northern Bean (*Phaseolus Vulgaris*) Protein Isolate", Journal of Food Science, vol. 40 (1975), pp. 81-84.

Aguilera, J. M. et al., "Roasting of Navy Beans (*Phaseolus Vulgaris*) by Particle-to-Particle Heat Transfer", Journal of Food Science, vol. 47 (1982), pp. 996-999, 1005-1006.

Aguilera, J. M. et al., "Development of Food Ingredients from Navy Beans (*Phaseolus Vulgaris*) by Roasting, Pin Milling, and Air Classification", Journal of Food Science, vol. 47 (1982), p. 1154.

Chang, Ruth et al., "Phytate: Removal From Whole Dry Beans by Enzymatic Hydrolysis and Diffusion", Journal of Food Science, vol. 42, No. 4 (1977), pp. 1098-1101.

Lolas, George M. et al., "The Phytase of Navy Beans (*Phaseolus Volgaris*)", Journal of Food Science, vol. 42, No. 4 (1977), pp. 1094-1097, 1106.

Patel, M. et al., "Amino Acid and Mineral Profile of Air-Classified Navy Bean Flour Fractions", American Association of Cereal Chemists, Inc., 1980, vol. 57, No. 2, pp. 123-125.

Fleming, S. E., "Flatulence Activity of the Smooth-Seeded Field Pea as Indicated by Hydrogen Production in the Rat", Journal of Food Science, vol. 47 (1981), pp. 12-15.

Kon, Samuel, "pH Adjustment Control of Oxidative Off-Flavors During Grinding of Raw Legume Seeds", Journal of Food Science, vol. 35 (1970), pp. 343-345.

Smith, Allan K. et al., (Editors), "Soybeans: Chemistry and Technology", vol. 1, The AVI Publishing Company, Inc. 1972, pp. 179-182, 316-318.

Omosaiye, O., "Removal of Oligosacchardies from Soybean Water Extracts by Ultrafiltration", Journal of Food Science, vol. 43 (1978), pp. 354-360.

Rackis, J. J., "Flatulence Caused by Soya and Its Control through Processing", JAOCS, Mar. 1981, pp. 503-509.

*Primary Examiner*—Raymond N. Jones
*Assistant Examiner*—Marianne M. Cintins
*Attorney, Agent, or Firm*—Arnold, White & Durkee

[57] ABSTRACT

Flatulence-causing sugars can be removed from beans that contain such sugars through ultrafiltration. An ultrafiltration membrane system with a molecular weight cut-off between 30,000 and 100,000 daltons will permit the sugars to permeate through it, but it will retain most proteins.

1 Claim, No Drawings

PROCESS FOR REMOVING FLATULENCE-CAUSING SUGARS FROM BEAN PRODUCTS

BACKGROUND OF THE INVENTION

The present invention concerns beans which contain flatulence-causing sugars, and more specifically, methods of processing such beans that remove flatulence-causing sugars while leaving most of the protein content intact.

Beans are a source of protein which has not been utilized yet to the extent it might. One reason why other sources of protein are sometimes preferred over beans is the gastrointestinal stress they can cause.

This distress is the result of the presence of certain sugars in beans, such as raffinose, stachyose, and verbascose. Enzymes such as α-galactosidases and β-D-fructosidases are needed to hydrolyze these sugars so they can be absorbed in the digestive tract. However, humans do not have those enzymes, so the sugars listed above are not absorbed. Instead, they are fermented by microorganisms in the intestines, producing flatus.

Several methods have been developed for removing flatulence-causing compounds from soybeans, a different type of beans than the ones contemplated for processing in accordance with the present invention. It is not clear whether the soybean processes will be useful for the types of beans contemplated by the present invention.

One category of soybean processes involves hot water treatment and aqueous alcohol extraction to insolubilize most of the protein in soybean meal. This method has the disadvantage that the protein is damaged in the process of being insolubilized. Also, one process in this category requires ethanol, a fairly expensive chemical, as a solvent.

Another soybean process involves protein extraction from soy flour or soy flakes and precipitation of protein from the extract by acid treatment. These procedures are relatively time-consuming and expensive, and generate whey as a by-product which contains a significant amount of protein and other valuable constituents. Soybeans have also been treated by enzymatic hydrolysis of the flatulence-causing sugars. The products of this group of processes are not known to have achieved commercial use. Some of the products produced by such processes have exhibited unacceptably high flatus activity and have also had low flavor acceptability.

Yet another category of soybean processes employs soaking and fermentation. However, this method is not believed likely to lend itself to large scale processing. One final method of processing soybeans involves germination, but the beneficial effects claimed for this process have not been clearly proven. Some researchers have observed flatulence reduction after germination, while others have not observed any such reduction. Soybeans have also been treated for the purpose of removing flatulence-causing sugars using hollow fiber reactors which contain immobilized enzymes. However, these processes operate on a soy milk, and there appears to be little commercial incentive to develop flatus-free soy beverages. These processes also have cost disadvantages because of the enzymes used as well as the necessity of protein extraction and clarification.

There is a need for methods of removing flatulence-causing sugars from beans that would leave most of the proteins intact. Such methods could produce bean products that would be more useful in meeting the nutritional needs of the world.

SUMMARY OF THE INVENTION

A method in accordance with the present invention of processing particulate bean products which contain flatulence-causing sugars includes the steps of suspending a particulate bean product in a solvent to produce a filterable feed; subjecting the filterable feed to ultrafiltration, using an ultrafiltration membrane system which has a molecular weight cut-off which will pass flatulence-causing sugars and retain the constituents of the particulate bean product which have greater molecular weights than the flatulence-causing sugars, thereby producing a permeate and a retentate; and recovering the retentate for use as a bean product with a reduced flatulence-causing sugar content. The present invention should be useful with the various types of beans which are relatively rich in the sugars responsible for flatus production. Examples of such beans are navy beans, chick peas, saba beans, field peas, pinto beans, cow peas, kidney beans, lima beans, and lentels. References to "particulate bean products" and the like in this patent are intended to include these examples, without being limited only to them.

The methods of the present invention produce substantially flatulence-free bean products which are also substantially free of unpleasant flavors and odors. The flavor and odor improvements can be achieved without applying conventional heat treatments. Also, as a result of the possibility of using lower processing temperatures in the present invention than in most prior art processes, the bean protein can be preserved in a more functional and nutritional state. Since the present invention does not require a clarified solution, no extraction and centrifugation are required. As a result, product yield is much higher than in a protein isolation procedure.

One specific embodiment of the present invention is a method which includes the steps of suspending a particulate bean product in water to produce a filterable feed, the water to particulate bean product ratio being between approximately 10:1 and 60:1 by weight; ultrafiltering the filterable feed using an ultrafiltration membrane system having a molecular weight cut-off between approximately 30,000 and 100,000 daltons, thereby producing a permeate and a retentate; and recovering the retentate for use as a bean product with the reduced flatulence-causing sugar content. In this embodiment, the ultrafiltration is performed in two sequential phases. In the first phase, water is added to the filterable feed at the same rate as permeate is being produced, until the total permeate produced is approximately 1.0 to 3.0 times the original volume of the filterable feed. In the second phase of ultrafiltration, no water is added to the filterable feed while ultrafiltration is continued. The filtration is continued until the total volume of permeate produced is approximately 1.0 to 3.0 times the original volume of the filterable feed.

DETAILED DESCRIPTION OF SPECIFIC EMBODIMENTS

Methods in accordance with the present invention can be performed on any one type of beans which contain flatulence-causing sugars, but can also be performed on mixtures of different types of such beans. The mixtures can be selected to provide a good balance of nutrients, for example by adding a type of bean which is relatively rich in an amino acid that is lacking in another type of bean used in the mixture.

If the processing begins with whole beans, they optionally can be heat treated first. Heat treatment can remove some unpleasant tastes and odors from the beans. This step is not required however, because the ultrafiltration will remove some undesirable flavor and odor constituents.

Another option is to dehull the beans before further processing. If the beans are not dehulled, the particles of hull that remain after grinding may be larger or tougher than desirable for the final product. However, it should be recognized that the beans need not be either heat treated or dehulled. It should also be recognized that the starting material could be bean flour or some other bean product, instead of whole beans.

If the beans or bean product are not already in a particulate form, they must be ground. The grinding can be done either dry or with a liquid such as hot or cool water. Cool water will sometimes have the advantage of protecting the proteins during grinding, while hot water could be used to inactivate some undesirable enzymes. Regardless of whether a liquid is used, the grinding will produce a particulate bean product. Grinding to a particle size that will pass through an 80 mesh British standard screen is satisfactory.

If the grinding produces a particulate bean product which has pieces of hull that are larger than desirable, the particulate bean product can be subjected to a prefiltration step to remove the large hull particles. This can be done by placing the particulate bean product on a vibrating screen, for example an 80 mesh British standard screen. Alternatively, a better grinding apparatus could be used to reduce the hull particles to acceptable sizes.

The particulate bean product is then suspended in a solvent, preferably water. The resulting suspension can contain both dissolved and undissolved solids, but it is important to keep the suspension stirred during ultrafiltration to help maintain a relatively uniform distribution of solids in the feed. Having the particulate bean product ground finely will aid in maintaining a uniform distribution. Solvents other than water may be used if their capacity to dissolve components of the particulate bean product exceeds that of water, but they must also be compatible with the ultrafiltration membranes used. The ratio of water to particulate bean product can be between about 10:1 and 60:1 by weight, but is preferably about 40:1 by weight. The suspension, or filterable feed, can have a pH between approximately 2 and 11, preferably about 4.5.

After a waiting period of 15 to 30 minutes, the filterable feed is ultrafiltered, preferably in a two step procedure. The filtration is through an ultrafiltration membrane having a molecular weight cut-off between about 30,000 and 100,000 daltons, with 100,000 being preferred. An ultrafiltration membrane with a molecular weight cutoff in this range will allow flatulence, flavor, and odor-causing compounds to pass, but will retain the bean protein and other desirable bean constituents. The ultrafiltration membrane system should preferably be a hollow fiber type or some other type which has a back flush capability. In such a system, the permeate can be pumped backed through the system in a direction opposite to the normal feed flow. This momentary reversal of flow can aid in rapid cleaning of the filter. Suitable ultrafiltration systems are available from Romicon, Inc., Woburn, Mass.

The first phase in the preferred filtration procedure is a constant feed volume or diafiltration phase. As some of the suspension passes through the ultrafiltration membrane, dividing the filterable feed into a permeate and a retentate, additional solvent is added to the filterable feed so that the volume of filterable feed remains substantially constant. In other words, solvent is added to the feed at the same rate at which permeate is being produced. This first phase is continued until the total volume of permeate is about 1.0 to 3.0 times the original volume of the filterable feed, preferably about 1.3 to 1.7 times that volume.

Subsequently the second phase of ultrafiltration begins, in which no solvent is added to the filterable feed. Permeation is permitted to continue until the total permeate equals from about 1.0 to 3.0 times the original filterable feed volume, preferably about 2.5 times that volume. After the filtration is complete, the retentate will be the protein-rich fraction, with many of the undesirable components having permeated through the membrane. During filtration, it is desirable to heat the filterable feed because increased temperature will generally lower the viscosity of the suspension and therefore increase the permeation rate. However, beans of the type contemplated for processing in accordance with the present invention contain significant amounts of starch, and excessive heat can cause the starch to gelatinize. Therefore, it will usually be desirable to keep the temperature below about 140° F.

The retentate can be used in liquid form, or can be dried. As an additional option, reverse osmosis can be used to recover valuable constituents from the permeate while also producing a reusable effluent water.

Another option is to add sodium sulfite ($Na_2SO_3$) to the filterable feed to adjust its pH to about 7.5. This will lower the viscosity of the filterable feed, and therefore will aid permeation and allow the membrane to produce a higher solids content in the retentate. Thus, less water will need to be removed from the retentate by spray drying or other drying methods in order to produce a dry product.

Processing in accordance with the present invention has been performed on an undehulled navy bean flour which had a moisture content of 8.04%, L-scale colors of 88.8 (dry) and 68.0 (wet), and the following percentages of various constituents (all on a dry weight basis): ash 4.16%, total nitrogen 4.10%, protein 25.62%, oil 1.69%, and total sugars 11.35%. Two runs were performed. In run A, the pH of the filterable feed was maintained at 4.5. In run B, the pH was initially 4.5 and stayed at that level for approximately the first two hours of filtration, but was then raised to 8.0 gradually during the last three hours of filtration. Flux through the membrane was observed to increase somewhat as the pH was raised. Both runs were performed with an ultrafiltration membrane system having a molecular weight cut-off of 100,000 daltons. The bean to water ratio was 50:1, and the processing temperatures were generally about 60° C., although at various points they were as low as 50° C. and as high as about 70° C.

Table 1 shows the percentage of solids and of total nitrogen that were retained by the ultrafiltration membrane. Table 2 shows data on the performance of the membrane during the two runs. Table 3 shows the percentages of the various constituents in the bean product before and after processing. Table 4 shows nitrogen solubility profiles for the products of the two runs. Table 5 shows the reduction in two flatulence-causing sugars achieved by processing in accordance with the present invention.

TABLE 1

Solids and Nitrogen Percentage Distribution During Processing to Remove Flatulence-Causing Sugars

| Fractions | Run A (pH 4.5) | Run B (pH 4.5 + 8.0) |
|---|---|---|
| Solids: | | |
| Solids in suspended flour | 100 | 100 |
| Solids retained by membrane | 81.2 | 78.7 |
| Solids in permeate | 19.8 | 21.3 |
| Nitrogen: | | |
| Nitrogen in suspended flour | 100 | 100 |
| Nitrogen retained by membrane | 86.0 | 84.7 |
| Nitrogen in permeate | 14.0 | 15.3 |

TABLE 2

Membrane Performance

| Performance Measurements | Run A (pH 4.5) | Run B (pH 4.5 + 8.0) |
|---|---|---|
| Mean flux (gal/ft$^2$/day) | 34.8 | 34.5 |
| Mean solids retention (%) | 81.2 | 78.7 |
| Mean total nitrogen retention (%) | 86.0 | 84.7 |
| Mean nonprotein nitrogen retention (%) | 16.6 | 23.2 |

TABLE 3

Analyses of Treated Products and Starting Material

| Run Identification | Moisture % | Ash | Nitrogen Total | Nitrogen NPN | Protein (NX6.25) | Sugars | L-scale Color Dry | L-scale Color Wet |
|---|---|---|---|---|---|---|---|---|
| | | | % Dry wt. basis | | | | | |
| A | 5.59 | 2.38 | 4.04 | 0.14 | 25.27 | 10.26 | 88.3 | 74.5 |
| B | 5.42 | 3.72 | 4.10 | 0.27 | 25.63 | 8.81 | 85.1 | 72.7 |
| Unprocessed bean flour | 8.04 | 4.16 | 4.10 | * | 25.63 | 11.35 | 88.8 | 68.0 |

*Not available

TABLE 4

Nitrogen Solubility Profiles (%)

| Run Identification | pH 2.0 | 2.5 | 3.0 | 3.5 | 4.0 | 5.5 | 6.0 | 7.0 | 9.0 |
|---|---|---|---|---|---|---|---|---|---|
| A | 53.3 | 43.4 | 22.7 | 8.5 | 5.0 | 33.2 | 27.4 | 51.3 | 62.6 |
| B | 67.0 | 57.7 | 21.3 | 7.0 | 17.1 | 35.7 | 46.8 | 75.0 | 81.6 |

TABLE 5

Raffinose and Stachyose Content

| Run Identification | Raffinose | Stachyose |
|---|---|---|
| Unprocessed bean flour | 1.62% | 7.92% |
| Run A | Trace | Trace |
| Run B | Trace | Trace |

The preceding description is intended to illustrate the present invention, not to give an exhaustive list of all of its possible embodiments. Those skilled in the art will recognize that modifications could be made to the above-described procedures which would remain within the scope and spirit of the present invention. One such modification would be concentrating the filterable feed by ultrafiltration, rediluting the retentate with water, and then reconcentrating it by ultrafiltration.

We claim:

1. A method of processing navy beans, including the steps of:
    (a) grinding the beans to produce a particulate bean product;
    (b) suspending the particulate bean product in water to produce a filterable feed, the water to bean product ratio being between approximately 10:1 and 60:1 by weight;
    (c) ultrafiltering the filterable feed using an ultrafiltration membrane system which as a molecular weight cut-off between approximately 30,000 and 100,000 daltons, thereby producing a permeate and a retentate, the ultrafiltration comprising two sequential phases:
        (i) a first phase in which water is added to the filterable feed at the same rate as permeate is being produced, until the total permeate produced is approximately 1.0 to 3.0 times the original volume of the filterable feed, and
        (ii) a second phase in which no water is added to the filterable feed while ultrafiltration is continued, until the total volume of permeate produced is approximately 1.0 to 3.0 times the original volume of the filterable feed; and
    (d) recovering the retentate.

* * * * *